US012796864B2

(12) United States Patent
Binns

(10) Patent No.: US 12,796,864 B2

(45) Date of Patent: Nov. 17, 2026

(54) BLENDER WITH CONTAINER OR JAR THAT IS REVERSIBLY ATTACHABLE TO ANY SIZED DISPOSABLE BOTTLE OF WATER

(71) Applicant: Thomas Lee Binns, Plymouth, CA (US)

(72) Inventor: Thomas Lee Binns, Plymouth, CA (US)

( * ) Notice: Subject to any disclaimer, the term of this patent is extended or adjusted under 35 U.S.C. 154(b) by 239 days.

(21) Appl. No.: 18/749,977

(22) Filed: Jun. 21, 2024

(65) Prior Publication Data

US 2025/0386973 A1 Dec. 25, 2025

Related U.S. Application Data

(60) Provisional application No. 63/533,746, filed on Aug. 21, 2023.

(51) Int. Cl.

| | |
|---|---|
| ***A47J 43/07*** | (2006.01) |
| ***A47J 43/046*** | (2006.01) |
| ***A47J 43/08*** | (2006.01) |
| ***B65D 1/02*** | (2006.01) |
| ***B65D 23/00*** | (2006.01) |

(52) U.S. Cl.

CPC ......... *A47J 43/0727* (2013.01); *A47J 43/046* (2013.01); *A47J 43/0722* (2013.01); *A47J 43/085* (2013.01); *B65D 1/02* (2013.01); *B65D 23/00* (2013.01)

(58) Field of Classification Search

CPC .................................................. A47J 43/0711

See application file for complete search history.

(56) References Cited

U.S. PATENT DOCUMENTS

| | | | | |
|---|---|---|---|---|
| 10,383,482 | B1 * | 8/2019 | Pamplin | A47J 43/0766 |
| 12,332,322 | B2 * | 6/2025 | Howard | H02H 3/33 |
| 2025/0065285 | A1 * | 2/2025 | Domingo | B01F 23/53 |

* cited by examiner

*Primary Examiner* — Matthew Katcoff

(74) *Attorney, Agent, or Firm* — Craig A. Simmermon

(57) ABSTRACT

A special food preparation blender that is reversibly attachable to a disposable bottle of water for the purpose of adding an edible powder additive to the water in a disposable bottle of water. The blender has a container or jar that is: removable from a base, funnel-shaped or bell-shaped, and reversibly attachable to a disposable bottle of water so that the edible powder may be added to the bottle of water, then transferred to the blender container, then blended, and then poured back into the bottle of water, in a clean, neat fashion without any drips or leaks. Then a person drinks the blended product from the disposable bottle of water and receives much pleasure. The blended product is a smooth, frothy, homogeneous blend that is much more desirable and pleasurable to drink than an unblended lumpy mix of water and undissolved powder.

2 Claims, 10 Drawing Sheets

BLENDER WITH CONTAINER OR JAR THAT IS REVERSIBLY ATTACHABLE TO ANY SIZED DISPOSABLE BOTTLE OF WATER

BACKGROUND OF THE INVENTION

1. Field of the Invention

This invention relates to a special blender that is reversibly attachable to a disposable bottle of water for the purpose of adding an edible powder additive to the water in a disposable bottle of water. Specifically, the blender has a container or jar that is: removable from a base, funnel-shaped or bell-shaped, and reversibly attachable to a disposable bottle of water so that the edible powder may be added to the bottle of water, then transferred to the blender container, then blended, and then poured back into the bottle of water, in a clean, neat fashion without any drips or leaks. Then a person drinks the blended product from the disposable bottle of water and receives much pleasure. The blended product is a smooth, frothy, homogeneous blend that is much more desirable and pleasurable to drink than an unblended lumpy mix of water and undissolved powder.

2. Description of Related Art

There are many blenders in the prior art, however, there are none as shown and described here that include a special blender container that is funnel-shaped or bell-shaped and has a special water bottle connector on it. There are many aspects of the special blender container that are not present in the prior art. Further, there are no blenders in the prior art that allow a user to attach the blender container to a water bottle, pour edible powder into the water bottle like a funnel, then turn the blender container over, to fully blend the edible powder and water mix, then turn the blender container over again, to pour the mix back into the water bottle, and then allow the user to consume the blend from the water bottle, as shown and describe below. The edible powder may be: protein powder, vitamin powder, supplement powder, workout mix powder, or any other type of edible powder. A person may blend and create the blended drink at the gym or work out space, whereupon other people at the gym or work out space can watch and envy your creation. Many people pour edible powder into a water bottle, shake, and then consume the mix, however, when done this way, the mix is never fully blended and homogeneous. This method results in distasteful clumps of powder in the water, unconsumed residue at the at the sides and bottom of the water bottle, powder clumps stuck in your throat, and other undesirable characteristics. This invention is a blender that is reversibly attachable to a water bottle that is used to solve this problem.

BRIEF SUMMARY OF THE INVENTION

It is an aspect of blender with container or jar that is reversibly attachable to any sized disposable bottle of water to be reversibly attachable to any disposable water bottle with a water-tight connection.

It is an aspect of blender with container or jar that is reversibly attachable to any sized disposable bottle of water to include a funnel-shaped or bell-shaped container that is reversibly attachable to a base with an electric motor.

It is an aspect of blender with container or jar that is reversibly attachable to any sized disposable bottle of water to include a funnel-shaped or bell-shaped container that acts as a funnel to feed powder into a disposable water bottle.

It is an aspect of the funnel-shaped or bell-shaped container to have a male external threads on its lower end.

It is an aspect of the funnel-shaped or bell-shaped container to a large flange above its male external threads.

It is an aspect of the funnel-shaped or bell-shaped container to have one or more support ribs running longitudinally along the exterior of the container.

It is an aspect of the funnel-shaped or bell-shaped container to have a special water bottle connector at its upper end.

It is an aspect of the funnel-shaped or bell-shaped container to have a flange below its water bottle connector.

It is an aspect of the special water bottle connector to include: a water bottle socket, a first O-ring, and a second O-ring to seal the connection between the container or jar and the mouth of a disposable water bottle.

It is an aspect of blender with container or jar that is reversibly attachable to any sized disposable bottle of water to include a base with: a motor, an agitator, and a container or jar attachment area that is used to reversibly attach the container or jar to the base.

DEFINITION LIST

Figure 1:
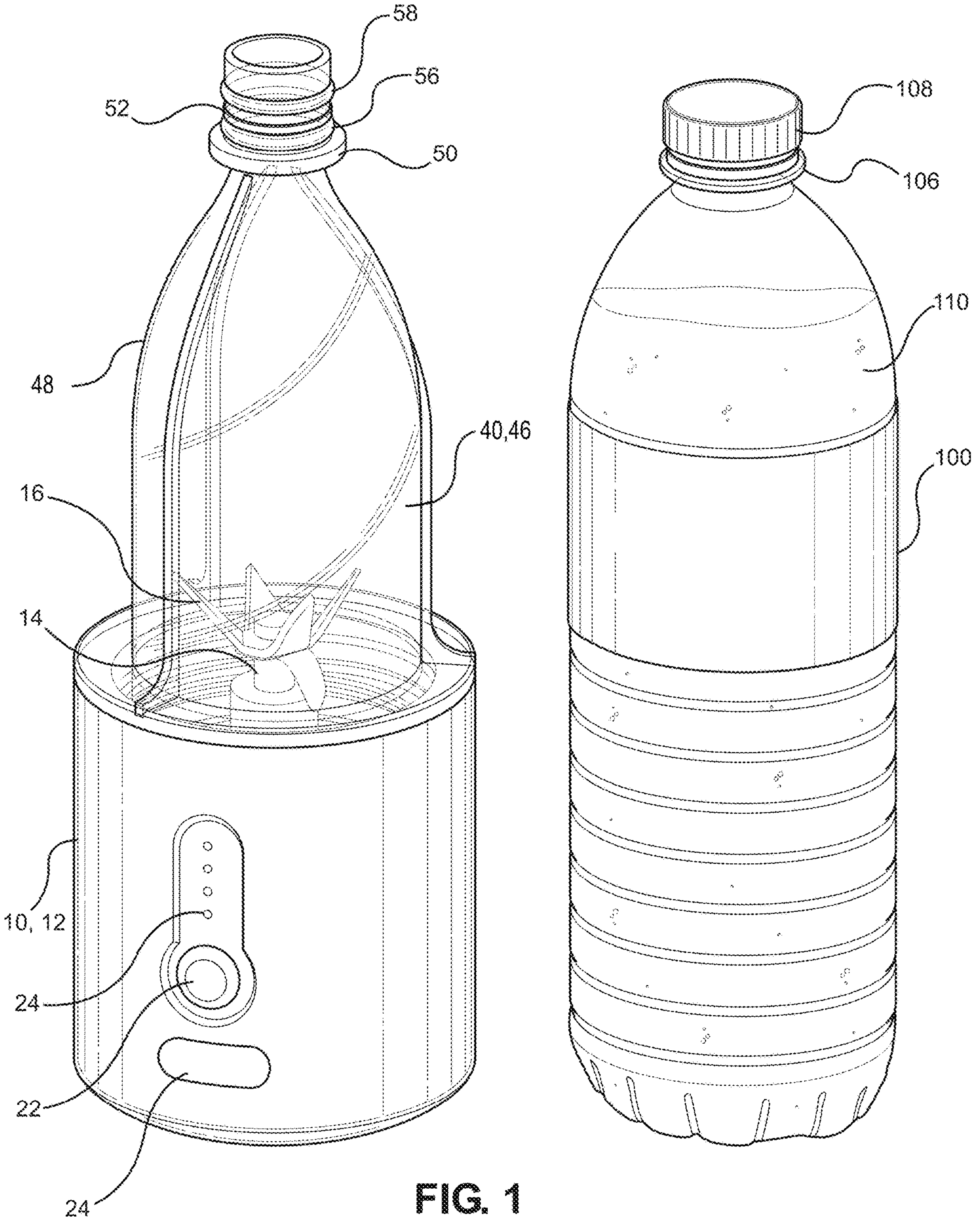
FIG. 1 is a perspective view of blender with container or jar that is reversibly attachable to any sized disposable bottle of water on the left and a disposable bottle of water on the right.

| Term | Definition |
|---|---|
| 5 | Blender with Container or Jar that is Reversibly |

-continued

| Term | Definition |
|---|---|
| | Attachable to Any Sized Disposable Bottle of Water |
| 10 | Base |
| 12 | Housing |
| 14 | Drive Shaft |
| 16 | Blade or Agitator |
| 18 | Container or Jar Attachment Area on Base |
| 20 | Base Flange |
| 22 | Control Button or Knob |
| 24 | Indicator Light |
| 40 | Container or Jar |
| 42 | Base Attachment Area on Container or Jar |
| 44 | Lower Container Flange |
| 46 | Main Body of Container or Jar |
| 48 | Support Rib on Container or Jar |
| 50 | Upper Container Flange |
| 52 | Water Bottle Connector on Container or Jar |
| 54 | Water Bottle Socket |
| 56 | First O-Ring on Water Bottle Connector |
| 58 | Second O-Ring on Water Bottle Connector |
| 100 | Disposable Bottle of Water |
| 102 | Mouth on Disposable Bottle of Water |
| 104 | Male Thread on Disposable Water Bottle |
| 106 | Flange on Disposable Water Bottle |
| 108 | Cap on Disposable Bottle of Water |
| 110 | Water |
| 120 | Edible Powder |
| 130 | Blended Edible Powder and Water |
| 140 | Person Enjoying the Consumption of 130 |

DETAILED DESCRIPTION OF THE INVENTION

Blender with container or jar that is reversibly attachable to any sized disposable bottle of water 5 comprises: a base 10 and a container or jar 40. A blender is an electric mixing machine used in food preparation for liquefying, chopping, or pureeing.

Base 10 comprises: a housing 12; a battery; an electric motor; drive shaft 14; a blade or agitator 16; a container or jar attachment area 18; a base flange 20; a control button or knob 22; and one or more indicator lights 24.

Housing 12 is a rigid protective cover, jacket, or casing. Housing 12 has a lower end, a side or sides, and an upper end. Housing 12 is a protective cover for the battery, motor, and wiring of the blender 5. Housing 12 may be made of any known material such as plastic, metal, or composite material. In best mode, housing 12 is made of plastic material.

Electric motor (not depicted) is an electrical machine that converts electrical energy into rotational mechanical energy. Electric motors operate through the interaction between the motor's magnetic field and electric current in a wire winding to generate force in the form of torque applied on a drive shaft on the electric motor. Electric motor is powered by direct current from the battery. Any known type of electric motor may be used. All blenders have a motor.

Battery (not depicted) is a source of direct current electric power comprising of one or more electrochemical cells with external connections. When the battery is connected to external electric load, i.e. the electric motor, a redox reaction converts high-energy reactants to lower-energy products, and the free-energy difference is delivered to the electric motor as electrical energy. Battery is connected to electric motor so that there is reversible electrical continuity or a switched connection between these members. Any known type of direct current battery may be used. In this mode, the blender with container or jar that is reversibly attachable to any sized disposable bottle of water 5 is power by direct current from a battery. In best mode, battery is a rechargeable lithium ion battery.

Alternately, instead of a battery, electric motor may be connected to a rectifier which is an electrical device that converts alternating current (AC) into direct current (DC). The rectifier is connected to an alternating power source, thereby using an alternating power source instead of a battery as a power source. In this mode, the blender with container or jar that is reversibly attachable to any sized disposable bottle of water 5 is power by alternating current.

Electric motor has a drive shaft 14 which is partially depicted in the drawings. Drive shaft is a rigid oblong member or cylindrical member with a first end and a second end. The first end of drive shaft 14 is rigidly attached to the electric motor. The second end of drive shaft is rigidly attached to the blade or agitator 16. All blenders have a drive shaft.

Blade or agitator 16 is a propeller, screw, or rotor that functions to blend the contents container or jar 40 when the blender is turned on. Blade or agitator 16 is a revolving shaft with two or more angled knives or blades attached thereto. When the blender is turned on, the blade or agitator 16 rotates at a high rotations per minute to mix, slice, and/or chop up the contents in the container or jar 40. Blade or agitator 16 is located at the upper end of housing 12, as depicted. Any known type of blade or agitator may be used. All blenders have a blade or agitator.

Container or jar attachment area 18 is a special female threaded fitting that is designed to engage with and reversibly attach to the base attachment area 42 on the container or jar 40. Container or jar attachment area 18 is a rigid hollow cylindrical member with a first end, a second end, an inner surface, an outer surface, a center axis, and a longitudinal axis. The first end of rigid hollow cylindrical member is closed and is part of the upper end of housing 12. The outer surface of rigid hollow cylindrical member is closed and is part of the side of housing 12. The inner surface of rigid hollow cylindrical member is closed is also part of the housing 12. The inner surface of rigid hollow cylindrical member has a female helical thread molded or engraved therein. Thus, there is a length of female thread on the inner surface of rigid hollow cylindrical member. The upper end of rigid hollow cylindrical member is open. The upper end of rigid hollow cylindrical member functions to receive and an engage with the base attachment area 42 on container or jar 40. The female thread on the inner surface of rigid hollow cylindrical member is sized and shaped to engage with and screw onto the male thread on the base attachment area 42 on container or jar 40. The female thread on the inner surface of rigid hollow cylindrical member is sized and shaped to reversibly attach by threaded connection to the male thread on the base attachment area 42 on container or jar 40.

Optionally, the first end of rigid hollow cylindrical member may have a washer or seal ring (not depicted). Washer or seal ring is an anulus shaped elastomeric member with a thickness, an inner diameter, and an outer diameter. The washer or seal ring functions to seal the lower end of container or jar 40 to the base 10 when the container or jar 40 is attached to the base 10 to prevent any liquid in the container or jar 40 from leaking onto the male treads of the base attachment area 42 on the container or jar 40 when the blender is running.

Container or jar attachment area 18 includes base flange 20. Base flange 20 is a rigid flat rim, collar, or annulus shape at the upper end of the rigid hollow cylindrical member of the container or jar attachment area 18. Base flange 20 has a thickness, an inner diameter, and an outer diameter. Base flange 20 functions to help rigidly and solidly hold container or jar 40 onto the base 10 when the container or jar 40 is attached to the base 10. As described below, the container or jar 40 is reversibly attached to the base 10 by threading the lower end of the container or jar 40 onto the upper end of the base 10. When this is done properly, a lower flange 44 on container or jar 40 makes contact with the base flange 20 on base 10 to add a large amount of support and rigidly between these members thereby yielding a very solid connection between the base 10 and the container or jar 40.

Control button or knob 22 is a button or knob in the standard definitions of the words. Control button or knob 22 is the physical actuator of an electrical switch that is connected to the battery so that there is electrical continuity between these members.

Control button or knob 22 is also connected to the electric motor so that there is electrical continuity between these members. Control button or knob 22 functions as the switch to turn on and off the blender i.e. the electric motor.

Optionally, blender with container or jar that is reversibly attachable to any sized disposable bottle of water 5 may further comprise: a printed circuit board, a control module, and/or an integrated circuit (not depicted). In this case, printed circuit board, a control module, and/or an integrated circuit is connected to the battery so that there is electrical continuity between these members and printed circuit board, a control module, and/or an integrated circuit is connected to the control button or knob 22 so that there is electrical continuity between these members. Printed circuit board, a control module, and/or an integrated circuit are loaded with special software that functions to control the electric motor in sophisticated ways such as by setting the blender speed to low, medium, or high with the use of only one control button or knob 22. Printed circuit board, a control module, and/or an integrated circuit are loaded with special software that functions to signal with one or more Indicator lights 24 that the battery is full, empty, and/or needs charging or is charging.

Each one or more Indicator light 24 is a light or source of illumination which may be any known illumination source such as a light bulb, lamp, or LED. Each one or more Indicator light 24 signifies when the electric motor is on, the speed of motor, any type of battery indicator light, or any other event.

Container or jar 40 comprises: a base attachment area 42; a lower container flange 44; a main body 46; one or more support ribs 48; an upper container flange 50; and a water bottle connector 52. Container or jar 40 is a rigid funnel-shaped or bell-shaped member with open ends. This is because it functions as a funnel in the process of using the blender with container or jar that is reversibly attachable to any sized disposable bottle of water 5. Container or jar 40 is a one-piece unitary body or structure. Container or jar 40 may be made of any known material such as plastic, metal, glass, or composite material. Container or jar 40 may be transparent, translucent, or opaque. In best mode, container or jar 40 is made of very hard and tough transparent plastic material, as depicted.

Base attachment area 42 is a special male threaded fitting that is designed to engage with and reversibly attach to container or jar attachment area 18 on base 10. Base attachment area 42 is a rigid hollow cylindrical member with a first end, a second end, an inner surface, an outer surface, a center axis, and a longitudinal axis. The first end of rigid hollow cylindrical member is open. The outer surface of rigid hollow cylindrical member has a male helical thread molded or engraved therein. Thus, there is a length of male thread on the outer surface of rigid hollow cylindrical member. The second end of rigid hollow cylindrical member is open. The second end of rigid hollow cylindrical member is contiguous with the lower container flange 44. The base attachment area 42 is contiguous and integral with the lower container flange 44 and made from the same piece of material. Base attachment area 42 functions to receive and an engage with container or jar attachment area 18 on base 10. The male thread on the outer surface of rigid hollow cylindrical member is sized and shaped to engage with and screw into the female thread on container or jar attachment area 18 on base 10. The male thread on the outer surface of rigid hollow cylindrical member is sized and shaped to engage to reversibly attach by threaded connection to the female thread on container or jar attachment area 18 on base 10. The base attachment area 42 is located at the wide end of funnel-shaped or bell-shaped member.

Lower container flange 44 is a rigid flat rim, collar, or annulus shape at the upper end of the rigid hollow cylindrical member of the base attachment area 42. Lower container flange 44 has a thickness, an inner diameter, an outer diameter, a lower end, and an upper end. The inner and outer diameters of lower contain flange 44 match those of base flange 20. The inner diameter of lower container flange 44 matches that of the lower end of the main body 46. Lower container flange 44 functions to help rigidly and solidly hold container or jar 40 onto the base 10 when the container or jar 40 is attached to the base 10. The container or jar 40 is reversibly attached to the base 10 by threading the male thread on the base attachment area 42 onto the female thread on the container or jar attachment area 18. When this is done properly, a lower flange 44 on container or jar 40 makes contact with the base flange 20 on base 10 to add a large amount of support and rigidly between these members thereby yielding a very solid connection between the base 10 and the container or jar 40. The lower end of lower flange 44 is contiguous with the second end of base attachment area 42 and made from the same piece of material.

In other modes, lower container flange 44 is deleted wherein the second end of base attachment area 42 is connected directly to the lower end of main body 46.

Main body 46 is a rigid hollow tapered cylindrical member or bottle-shaped member. Main body 46 has a lower end, a middle section, an upper end, a length, and a longitudinal axis. The lower end of main body 46 is an open circular end of the tapered cylindrical member. Lower end has an inner diameter and an outer diameter. The diameter of the lower end is the largest diameter of the tapered cylindrical member and larger than that of the upper end which is the smallest diameter of the taper cylindrical member. Thus, the taper goes up. The middle section of main body 46 is the tapper section of the tapered cylindrical member. The lower end of main body 46 is contiguous with the upper end of lower container flange 44 and made from the same piece of material. The upper end of main body 46 is an open circular end of the tapered cylindrical member. Upper end has an inner diameter and an outer diameter. The upper end of main body 46 is contiguous with the upper end of lower container flange 44 and made from the same piece of material.

Each one or more support ribs 48 is a rigid longitudinal fin, ridge, or tab or material running longitudinally from the lower container flange 44 to the upper container flange 50. Each one or more support ribs 48 functions to add rigidity and strength to the structure of the container or jar 40. Each one or more support ribs 48 is contiguous with the main body 46 and made from the same piece of material.

Upper container flange 50 is a rigid flat rim, collar, or annulus shape at the upper end of main body 46. Upper container flange 50 has a thickness, an inner diameter, an outer diameter, a lower end, and an upper end. The inner diameter of upper container flange 50 matches that of the upper end of the main body 46. Upper container flange 50 functions as a sturdy sill or seat to press down onto the mouth 102 or brim of a disposable bottle of water 100 in order to attach the container or jar 40 to a disposable bottle of water 100, as described below. Upper container flange 50 also functions to help rigidly and solidly connect the main body 46 to the water bottle connector 52. Upper container flange 50 also functions as a handle or finger hold for container or jar 40. Upper container flange 50 is contiguous with main body 46 and made from the same piece of material.

In other modes, upper container flange 50 is deleted wherein the upper end of main body 46 is connected directly to the first end of socket 54 of water bottle connector 52.

Water bottle connector 52 comprises: a socket 54; a first O-ring 56; and a second O-ring 58. Water bottle connector 52 is a special male socket fitting that is designed to engage with and reversibly attach to any sized disposable bottle of water 100 that one may buy from a store. This reversible attachment is water-tight and leak proof. Water bottle connector 52 is located at the narrow end of funnel-shaped or bell-shaped member.

Socket 54 is a rigid hollow cylindrical member with a first end, a second end, an inner surface, an outer surface, a center axis, a length, and a longitudinal axis. The first end of rigid hollow cylindrical member is open. The second end of rigid hollow cylindrical member is open. The first end of socket 54 is contiguous with the upper end of upper container flange 50 and made from the same piece of material. The second end of socket 54 is an open circular shape.

The outside surface of socket 54 has a lower circular groove or torus shaped groove molded or engraved therein. Lower circular groove or torus shaped groove has an outside diameter. The lower circular groove or torus shaped groove functions to receive and hold the first O-ring 56.

First O-ring 56 is a toric joint that is a mechanical gasket in the shape of a torus or a loop of elastomer or other resilient material with a round cross-section, designed to form a seal at the interface. First O-ring 56 is an elastic or resilient torus-shaped member with an inner diameter, an outer diameter, and a thickness. The inner diameter of first O-ring 56 is sized to make a friction fit with the outer diameter of lower circular groove or torus shaped groove. The first O-ring 56 is installed within the lower circular groove or torus shaped groove.

The outside surface of socket 54 has an upper circular groove or torus shaped groove molded or engraved therein. Upper circular groove or torus shaped groove has an outside diameter.

The upper circular groove or torus shaped groove functions to receive and hold the second O-ring 58.

Second O-ring 58 is a toric joint that is a mechanical gasket in the shape of a torus or a loop of elastomer or other resilient material with a round cross-section, designed to form a seal at the interface. Second O-ring 58 is an elastic or resilient torus-shaped member with an inner diameter, an outer diameter, and a thickness. The inner diameter of second O-ring 58 is sized to make a friction fit with the outer diameter of upper circular groove or torus shaped groove. The second O-ring 56 is installed within the upper circular groove or torus shaped groove.

The inner and outer diameters of first and second O-rings 56,58 may be different or they may be the same. The inner and outer diameters of first and second O-rings 56,58 are specifically sized, designed, and engineered to make a friction water-tight fit with the inner diameter of various sized disposable bottle of water 100 that one may buy from a store. The inner and outer diameters of first and second O-rings 56,58 can be varied to accommodate various sized disposable bottle of water 100 that one may buy from a store. Applicant has a primary size of inner and outer diameters of first and second O-rings 56,58 in a best mode or embodiment that fits 99 percent of all sized disposable bottle of water 100 that one may buy from a store.

Container or jar 40 is reversibly attachable to the base 10. The base attachment area 42 is reversibly attachable to the container or jar attachment area 18. The male thread on base attachment area 42 engages with the female thread on container or jar attachment area 18 to yield a water-tight attachment between the two members. When container or jar 40 is reversibly attached to base 10, the longitudinal axes of these members are coincident. The ability to detach the container or jar 40 from the base 10 along with the ability of the container or jar 40 to reversibly attach to any disposable bottle of water 100 through the use of the water bottle connector 52 allows for the blender with container or jar that is reversibly attachable to any sized disposable bottle of water 5 to be used for the specific purpose of adding edible powder 120 to the water 110 in the disposable bottle of water 100 and then vigorously blending the edible powder 120 and water 110 together to make a homogeneous frothy blend to drink that is much more pleasant and tasty to consume than a lumpy half mixed concoction of water 110 and undissolved power 120.

Blender with container or jar that is reversibly attachable to any sized disposable bottle of water 5 may be used in any number of ways.

Figure 2:
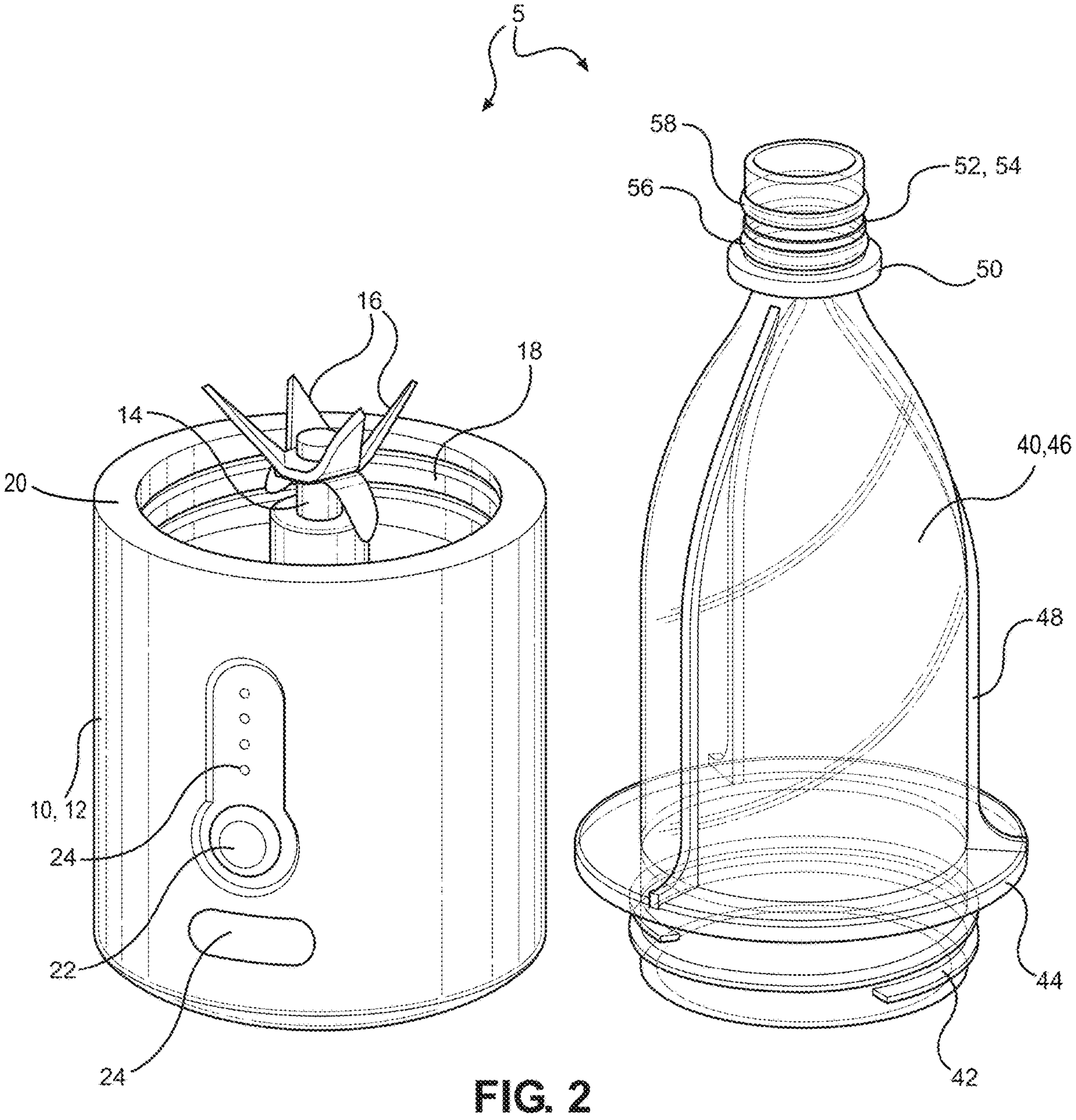
FIG. 2 is a perspective view of blender with container or jar that is reversibly attachable to any sized disposable bottle of water with the container or jar removed from the base of the blender.
Figure 3:
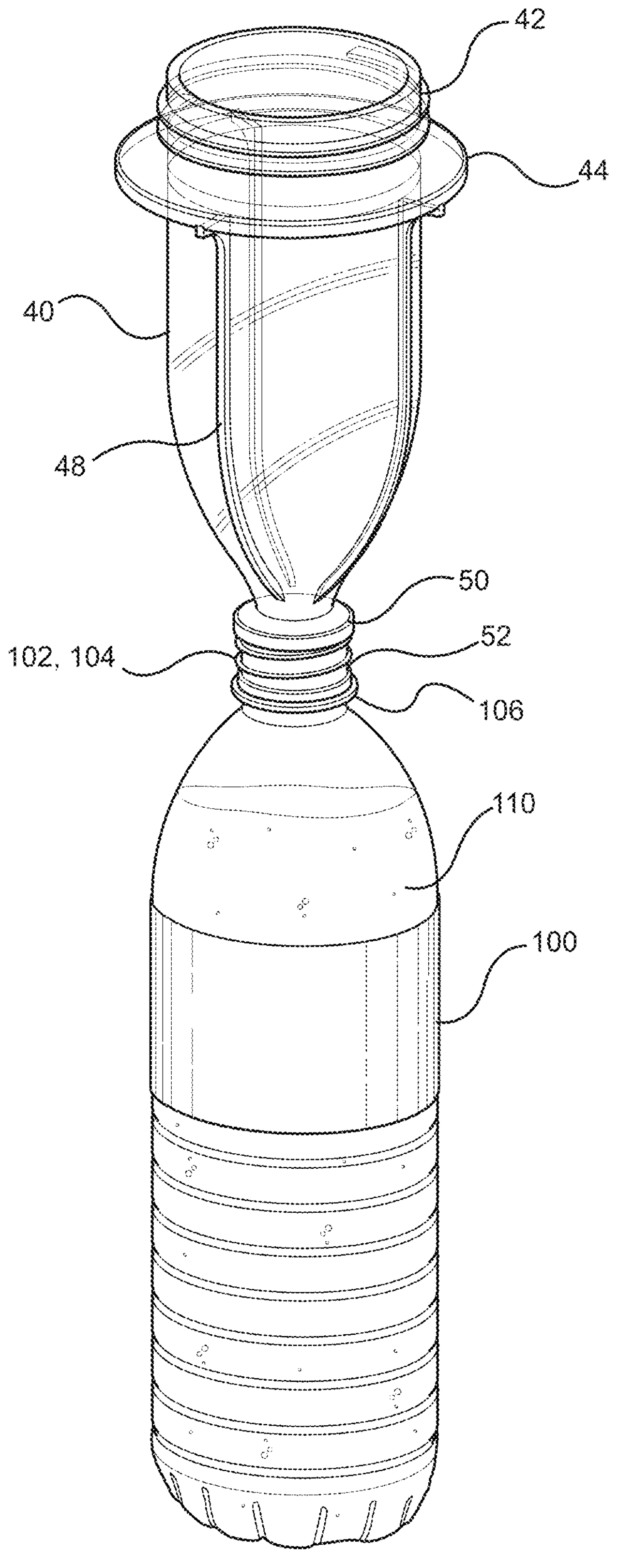
FIG. 3 is a perspective view of the disposable bottle of water with the container or jar attached to the mouth of the disposable bottle of water.
Figure 4:
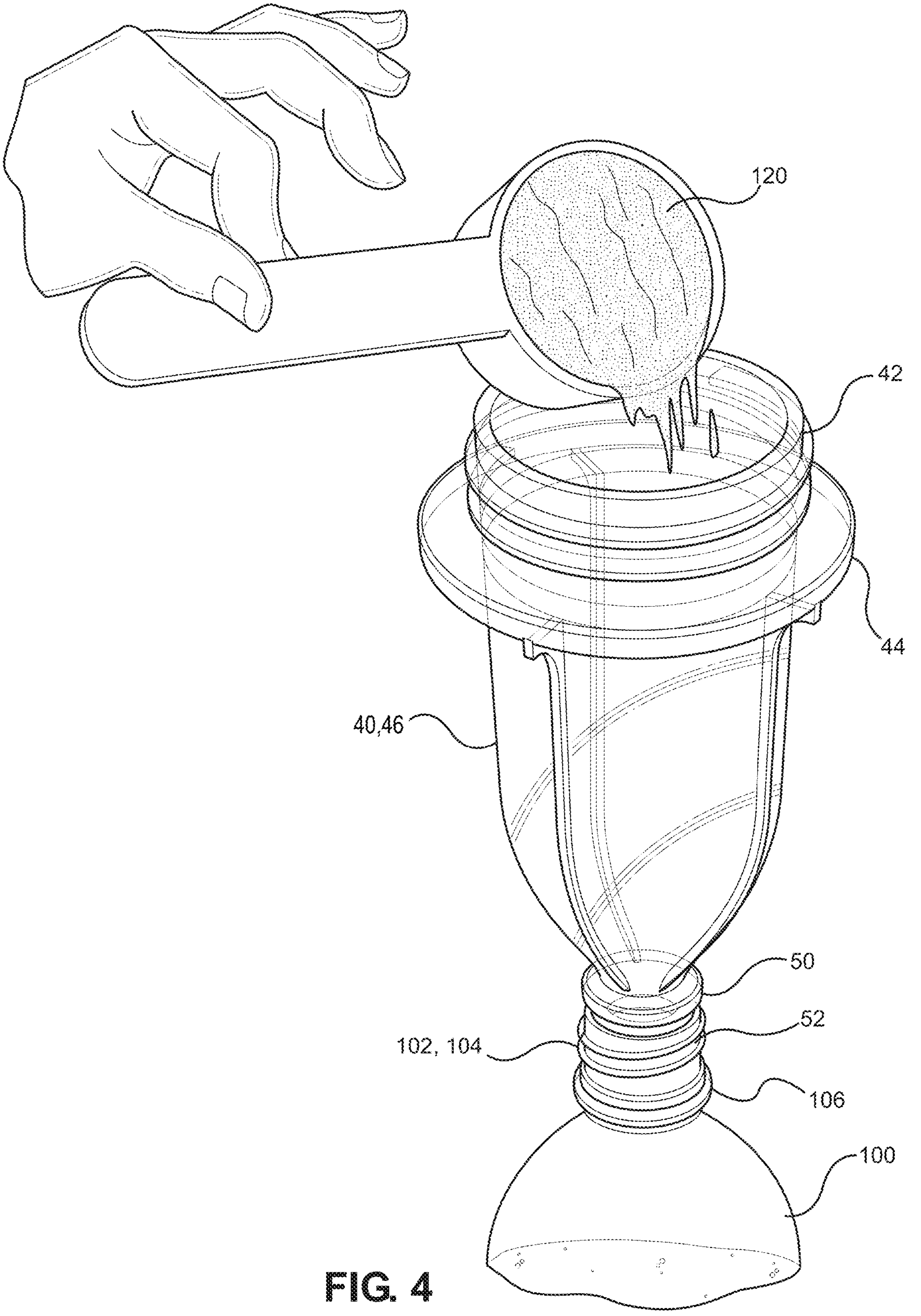
FIG. 4 is an enlarged view of FIG. 3 with a scoop of edible powder being poured into the wide end of container or jar wherein the container or jar is acting as a funnel for the edible powder to neatly pour into the disposable bottle of water.
Figure 5:
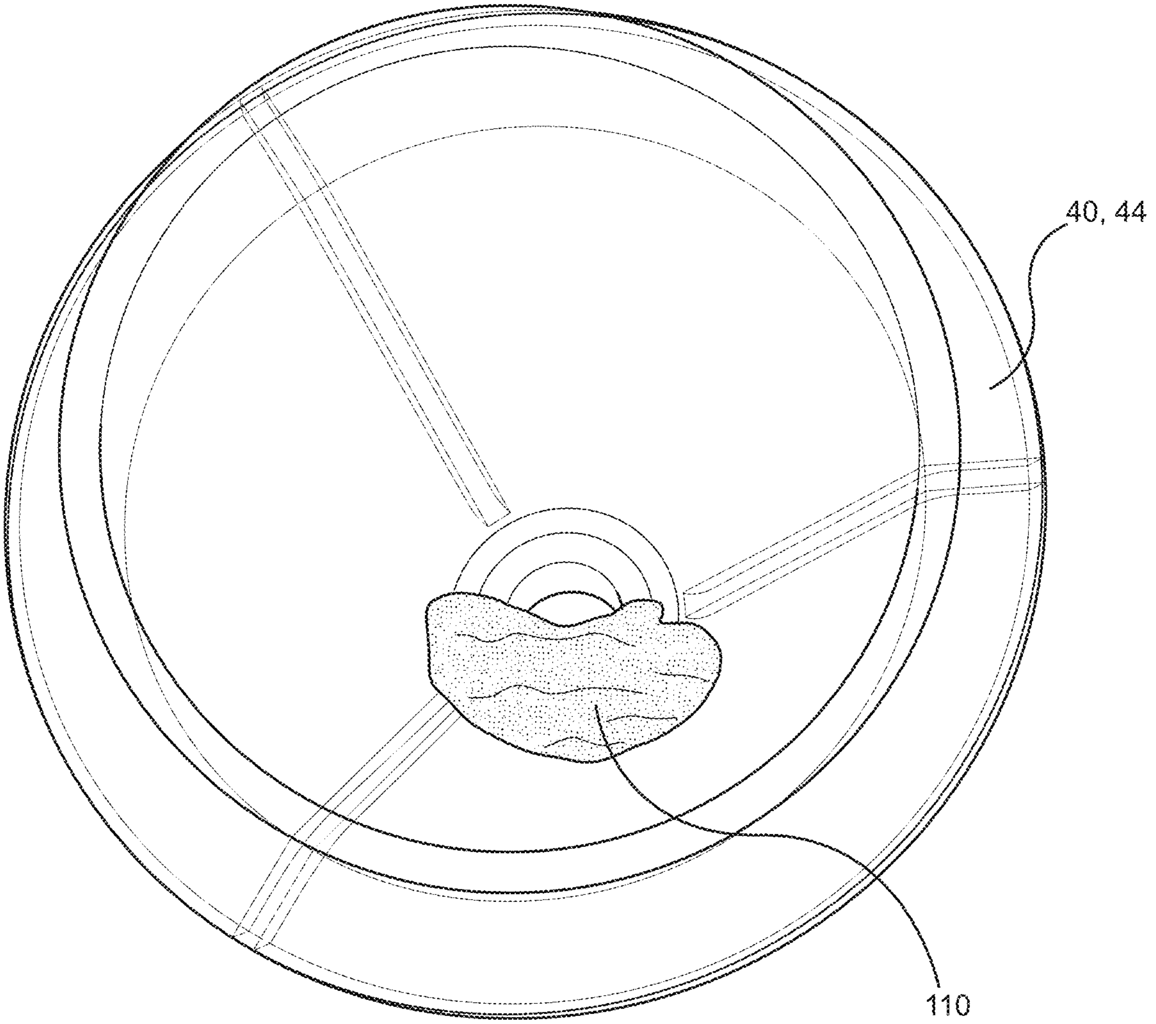
FIG. 5 is an enlarged view of the wide end of container or jar with edible powder being funneled into the disposable bottle of water.
Figure 6:
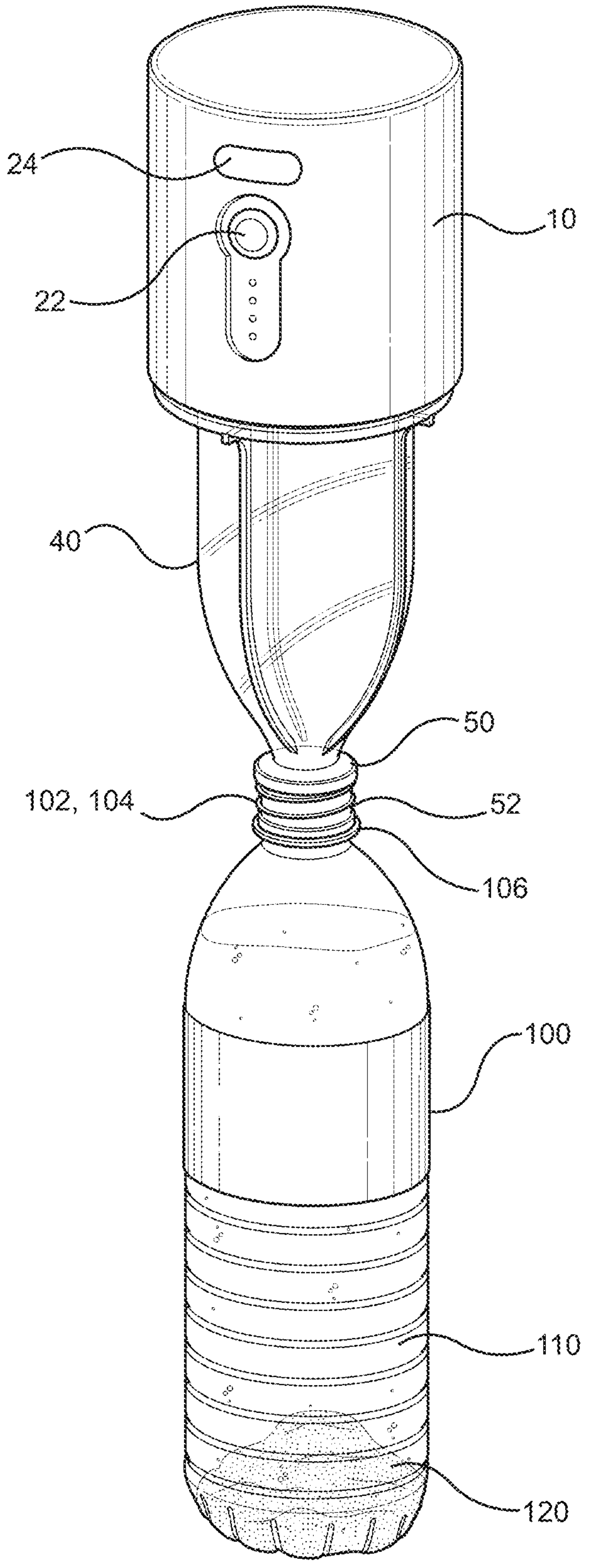
FIG. 6 is a perspective view after the blender base is re-attached to the container or jar, after all the edible powder has fallen into the disposable bottle of water.
Figure 7:
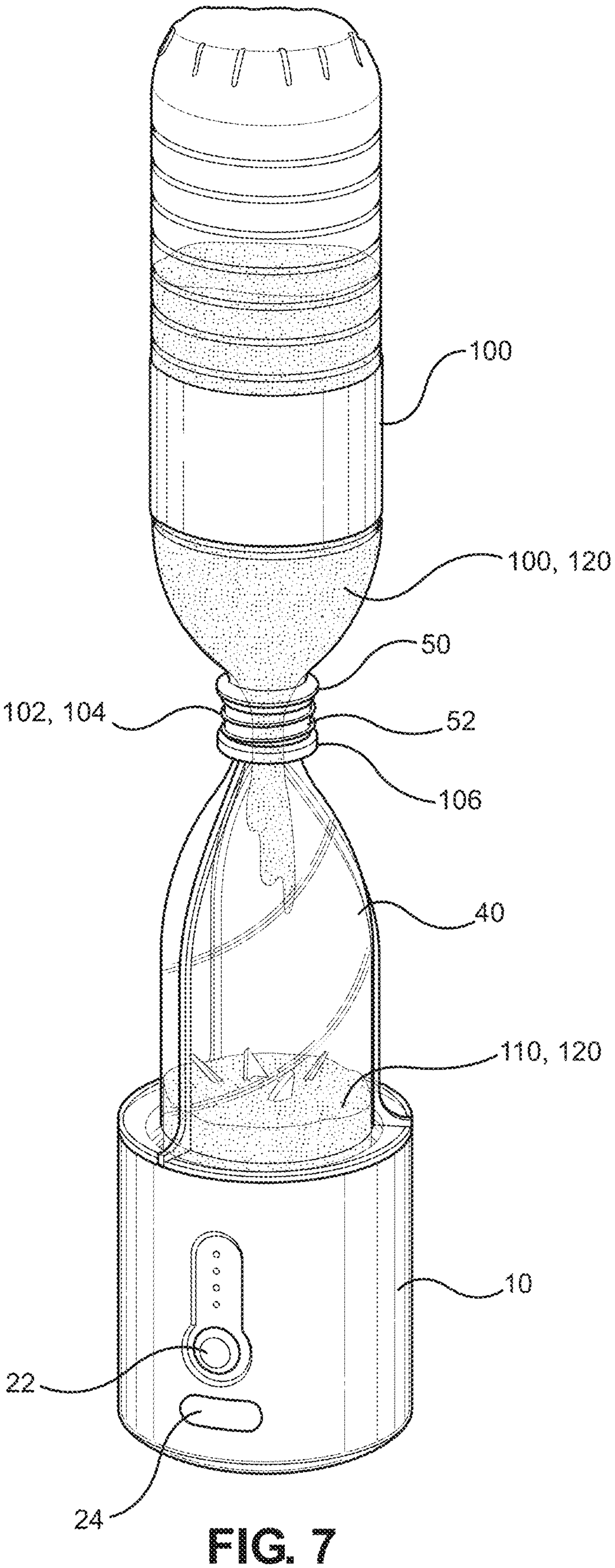
FIG. 7 is a perspective view after inverting the assembly of FIG. 6 and allowing the edible powder and water to drain into the container or jar of the blender.
Figure 8:
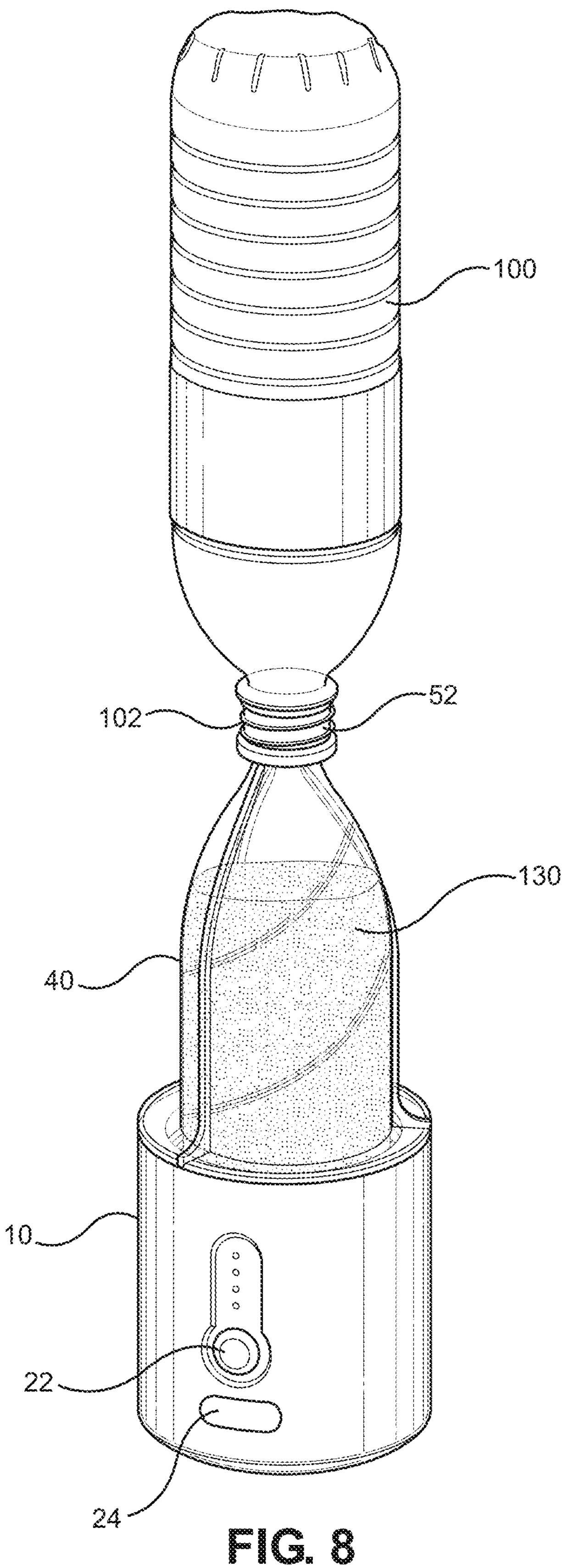
FIG. 8 is a perspective view after the blender has completely blended the edible powder and water together.
Figure 9:
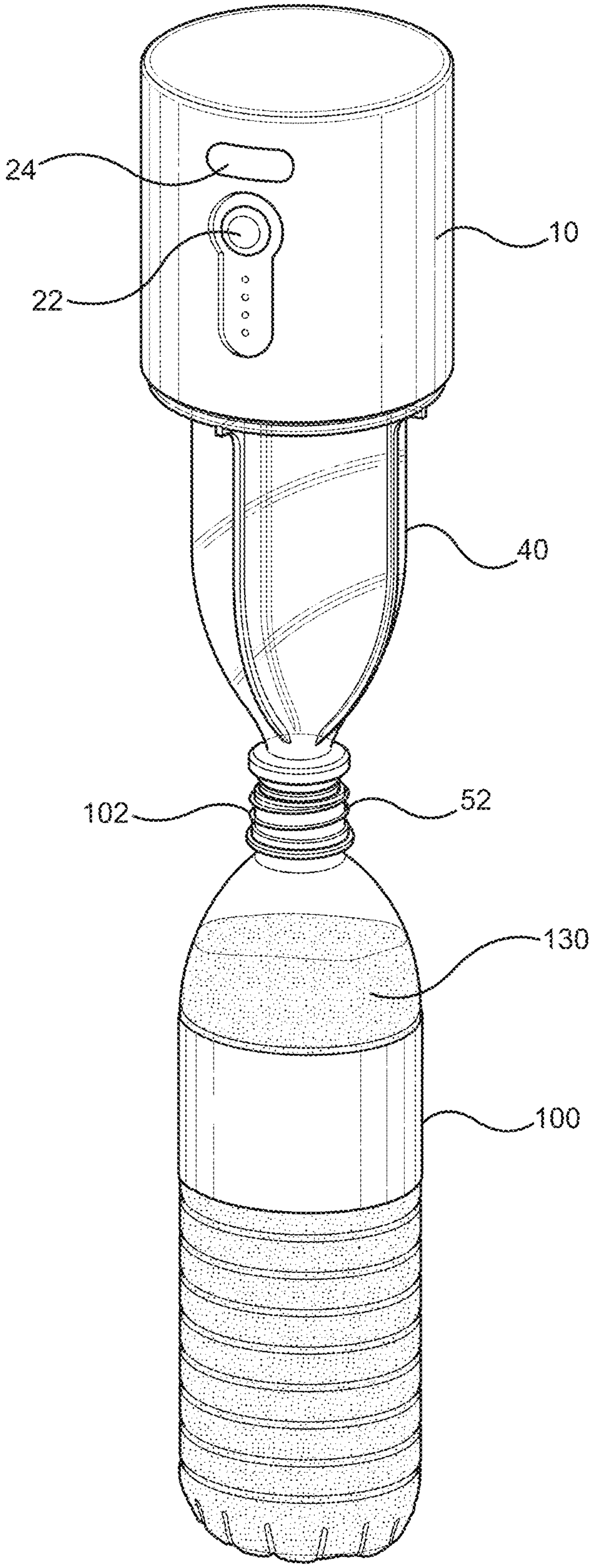
FIG. 9 is a perspective view after inverting the assembly of FIG. 9 and allowing the blended product of edible powder and water to drain into the disposable bottle of water.
Figure 10:
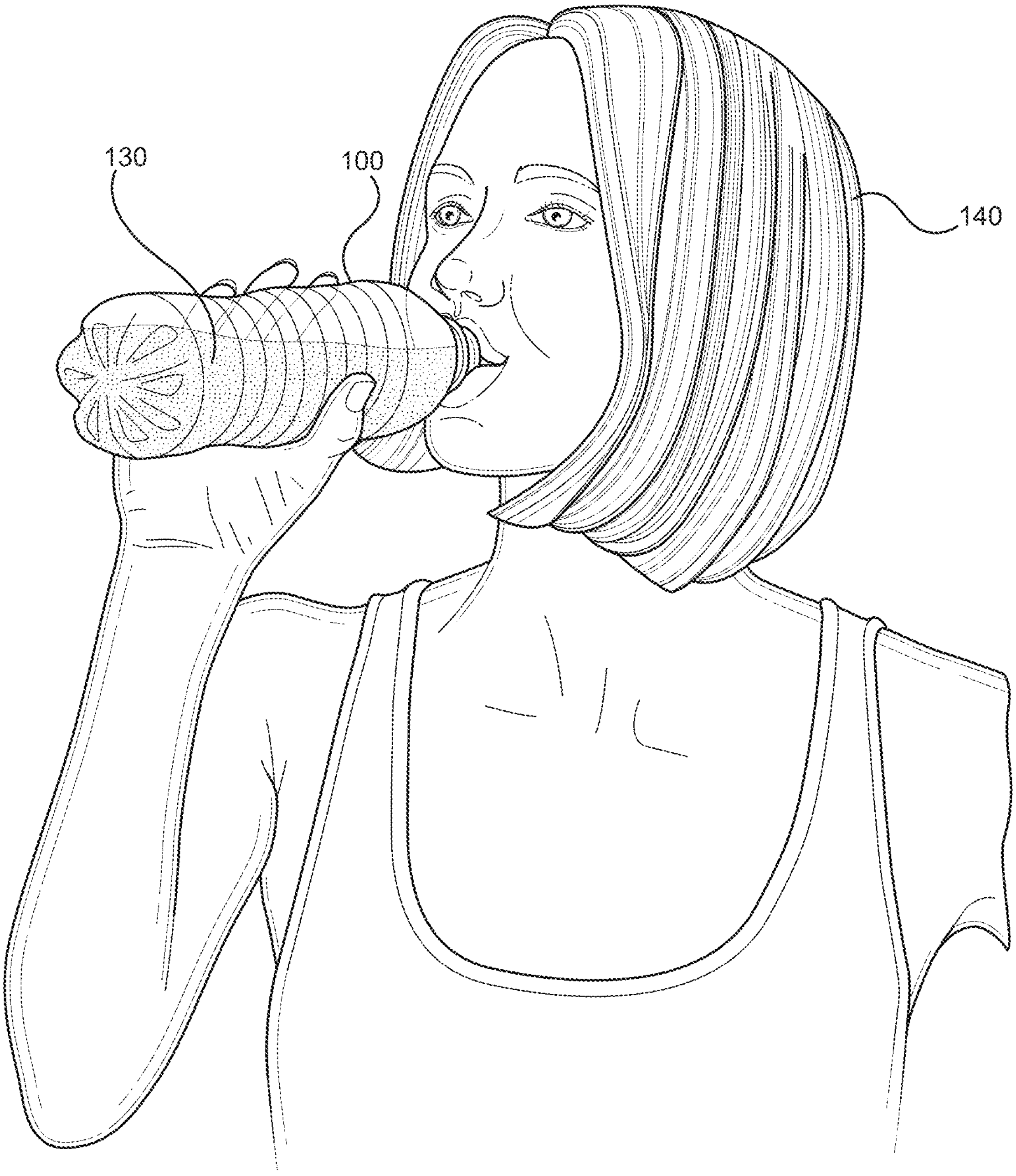
FIG. 10 is a perspective view of a person drinking the blended product of edible powder and water and receiving much pleasure therefrom.

One method of use of blender with container or jar that is reversibly attachable to any sized disposable bottle of water 5 is as follows. Blender with container or jar that is reversibly attachable to any sized disposable bottle of water 5 is paired with a full unopened disposable bottle of water 100 that one would buy from a store as depicted in FIG. 1. The container or jar 40 is removed from the base 10 by unscrewing the base attachment area 42 from the container or jar attachment area 18 to yield two separate pieces as depicted in FIG. 2. The water bottle connector 52 on the container or jar 40 is then reversibly attached to the mouth 102 of the bottle of water 100 by inserting the socket 54 into the mouth 102 of the disposable bottle of water 100 until the upper container flange 50 contacts the mouth 102 of the disposable bottle of water 100 as depicted in FIG. 3. The mouth 102 of the disposable bottle of water 100 is the very tip, end surface, or brim of the disposable bottle of water 100. As this occurs, the first and second O-rings 56,58 press against the inner surface of the mouth 102 of the disposable bottle of water 100, thereby making a water-tight seal between these members. Next, a scoop of edible powder 120 is added to the wide end of container or jar 40 as depicted in FIG. 4. FIG. 5 shows an enlarged view of the edible powder 120 inside the wide end of the container or jar 40. Then the base 10 is reattached to the container or jar 40 by screwing the base attachment area 42 to the container or jar attachment area 18 as depicted in FIG. 6. Then the assembly of FIG. 6 is inverted or turned upside down in order for the water 110 and edible powder 120 to drain into the container or jar 40 as depicted in FIG. 7. Once all the water 110 and edible powder 120 is drained into the container or jar 40, then the blender 65 is turned on in order to blend the water 110 and edible powder 120 together to form a smooth, frothy, homogeneous solution of blended edible powder and water 130 as depicted in FIG. 8. Then the assembly of FIG. 8 is inverted or turned upside down in order for the blended edible powder and water 130 to drain back into the disposable bottle of water 100 as depicted in FIG. 9. Finally, a person can enjoy consuming the blended edible powder and water 130 by drink right from the disposable bottle of water 100 as depicted in FIG. 10.

What is claimed is:

1. A blender comprising: a base and a container or jar, wherein, said base comprises: a housing; a battery; an electric motor; drive shaft; a blade or agitator; a container or jar attachment area; and a control button or knob, wherein, said housing is a rigid protective cover, jacket, or casing around said base, said electric motor is an electrical machine that converts electrical energy into rotational mechanical energy, said battery is a source of direct current electric power comprising of one or more electrochemical cells with external connections, said battery is connected to electric motor so that there is reversible electrical continuity or a switched connection therebetween, said blade or agitator is a propeller, screw, rotor, or shaft with two or more angled knives or blades attached thereto, said drive shaft is a rigid oblong member or cylindrical member with a first end and a second end, wherein, said first end of said drive shaft is rigidly attached to said electric motor and said second end of said drive shaft is rigidly attached to said blade or agitator, said container or jar attachment area is a female threaded fitting that engages with and reversibly attaches to a base attachment area on said container or jar, said container or jar attachment area is a rigid hollow cylindrical member with: a first end, a second end, and inner surface, an outer surface, a center axis, and a longitudinal axis, said first end of said container or jar attachment area is closed, said second end of said container or jar attachment area is open, said inner surface of said container or jar attachment area has a female helical thread molded or engraved therein, said female helical thread is sized and shaped to engage with and reversibly attach by threaded connection to a male helical thread on said base attachment area on said container or jar, said control button or knob is a button or knob that is connected to said battery so that there is electrical continuity therebetween and also connected to said electric motor so that there is electrical continuity therebetween, said container or jar comprises: a base attachment area; a main body; and a water bottle connector, wherein, said base attachment area is a male threaded fitting that is designed that engages with and reversibly attaches to said container or jar attachment area on said base, said base attachment area is a rigid hollow cylindrical member with: a first end, a second end, an inner surface, an outer surface, a center axis, and a longitudinal axis, said first end of said base attachment area is open, said second end of base attachment area is open, said outer surface of base attachment area has a male helical thread molded or engraved therein, said male helical thread is sized and shaped to engage with and reversibly attach by threaded connection to said female helical thread on said container or jar attachment area on said base, said main body is a rigid hollow tapered cylindrical member or bottle-shaped member, said main body has: a lower end, a middle section, an upper end, a length, and a longitudinal axis, said lower end of said main body is an open circular end with an inner diameter and an outer diameter, said lower end of said main body is connected to said second end of said base attachment area, said middle section of said main body is a hollow tapered cylindrical member, said upper end of said main body is an open circular end with an inner diameter and an outer diameter, said water bottle connector is a male socket fitting that is designed to that engages with and reversibly attaches a disposable bottle of water, said water bottle connector comprises: a socket; a first O-ring; and a second O-ring, wherein, said socket is a rigid hollow cylindrical member with a first end, a second end, an inner surface, an outer surface, a center axis, a length, and a longitudinal axis, said first end of said socket is an open circular end, said first end of said socket is connected to said upper end of said main body, said second end of said socket is an open circular end, said outer surface of said socket has a lower circular groove or torus shaped groove molded or engraved therein, said lower circular groove or torus shaped groove functions to receive and hold said first O-ring, said outer surface of said socket has an upper circular groove or torus shaped groove molded or engraved therein, said upper circular groove or torus shaped groove functions to receive and hold said second O-ring, said first O-ring is a toric joint that is a mechanical gasket shaped like a torus or a loop of material with a round cross-section, said first O-ring is made of elastomer or resilient material, said second O-ring is a toric joint that is a mechanical gasket shaped like a torus or a loop of material with a round cross-section, said second O-ring is made of elastomer or resilient material, said first O-ring is installed within said upper circular groove or torus shaped groove, and said second O-ring is installed within said upper circular groove or torus shaped groove.

2. A blender comprising: a base and a container or jar, wherein, said base comprises: a housing; a rectifier; an electric motor; drive shaft; a blade or agitator; a container or jar attachment area; and a control button or knob, wherein, said housing is a rigid protective cover, jacket, or casing around said base, said electric motor is an electrical machine that converts electrical energy into rotational mechanical energy, said rectifier is an electrical device that converts alternating current into direct current, said rectifier is connected to electric motor so that there is reversible electrical continuity or a switched connection therebetween, said blade or agitator is a propeller, screw, rotor, or shaft with two or more angled knives or blades attached thereto, said drive shaft is a rigid oblong member or cylindrical member with a first end and a second end, wherein, said first end of said drive shaft is rigidly attached to said electric motor and said second end of said drive shaft is rigidly attached to said blade or agitator, said container or jar attachment area is a female threaded fitting that engages with and reversibly attaches to a base attachment area on said container or jar, said container or jar attachment area is a rigid hollow cylindrical member with: a first end, a second end, and inner surface, an outer surface, a center axis, and a longitudinal axis, said first end of said container or jar attachment area is closed, said second end of said container or jar attachment area is open, said inner surface of said container or jar attachment area has a female helical thread molded or engraved therein, said female helical thread is sized and shaped to engage with and reversibly attach by threaded connection to a male helical thread on said base attachment area on said container or jar, said control button or knob is a button or knob that is connected to said rectifier so that there is electrical continuity therebetween and also connected to said electric motor so that there is electrical continuity therebetween, said container or jar comprises: a base attachment area; a main body; and a water bottle connector, wherein, said base attachment area is a male threaded fitting that is designed that engages with and reversibly attaches to said container or jar attachment area on said base, said base attachment area is a rigid hollow cylindrical member with: a first end, a second end, an inner surface, an outer surface, a center axis, and a longitudinal axis, said first end of said base attachment area is open, said second end of base attachment area is open, said outer surface of base attachment area has a male helical thread molded or engraved therein, said male helical thread is sized and shaped to engage with and reversibly attach by threaded connection to said female helical thread on said container or jar attachment area on said base, said main body is a rigid hollow tapered cylindrical member or bottle-shaped member, said main body has: a lower end, a middle section, an upper end, a length, and a longitudinal axis, said lower end of said main body is an open circular end with an inner diameter and an outer diameter, said lower end of said main body is connected to said second end of said base attachment area, said middle section of said main body is a hollow tapered cylindrical member, said upper end of said main body is an open circular end with an inner diameter and an outer diameter, said water bottle connector is a male socket fitting that is designed to that engages with and reversibly attaches a disposable bottle of water, said water bottle connector comprises: a socket; a first O-ring; and a second O-ring, wherein, said socket is a rigid hollow cylindrical member with a first end, a second end, an inner surface, an outer surface, a center axis, a length, and a longitudinal axis, said first end of said socket is an open circular member, said first end of said socket is connected to said upper end of said main body, said second end of said socket is an open circular member, said outer surface of said socket has a lower circular groove or torus shaped groove molded or engraved therein, said lower circular groove or torus shaped groove functions to receive and hold said first O-ring, said outer surface of said socket has an upper circular groove or torus shaped groove molded or engraved therein, said upper circular groove or torus shaped groove functions to receive and hold said second O-ring, said first O-ring is a toric joint that is a mechanical gasket shaped like a torus or a loop of material with a round cross-section, said first O-ring is made of elastomer or resilient material, said second O-ring is a toric joint that is a mechanical gasket shaped like a torus or a loop of material with a round cross-section, said second O-ring is made of elastomer or resilient material, said first O-ring is installed within said upper circular groove or torus shaped groove, and said second O-ring is installed within said upper circular groove or torus shaped groove.

* * * * *